United States Patent [19]
Roberts

[11] Patent Number: 6,053,696
[45] Date of Patent: Apr. 25, 2000

[54] IMPACT RESISTANT COMPOSITE SHELL FOR GAS TURBINE ENGINE FAN CASE

[75] Inventor: Paul David Denton Roberts, Brampton, Canada

[73] Assignee: Pratt & Whitney Canada Inc., Longueuil, Canada

[21] Appl. No.: 09/086,983

[22] Filed: May 29, 1998

[51] Int. Cl.[7] .................................................. F01B 25/16
[52] U.S. Cl. ................................................ 415/9; 415/200
[58] Field of Search ........................................ 415/9, 200

[56] References Cited

U.S. PATENT DOCUMENTS

| | | |
|---|---|---|
| 3,984,962 | 10/1976 | Krohn . |
| 4,012,549 | 3/1977 | Slysh . |
| 4,086,378 | 4/1978 | Kam et al. . |
| 4,137,354 | 1/1979 | Mayes, Jr. et al. . |
| 4,337,560 | 7/1982 | Slysh . |
| 4,428,998 | 1/1984 | Hawkinson . |
| 4,443,059 | 4/1984 | Wells . |
| 4,503,104 | 3/1985 | Belanger et al. ................. 428/34.1 |
| 4,699,567 | 10/1987 | Stewart ................................... 415/9 |
| 4,934,899 | 6/1990 | Patacca ................................. 415/200 |
| 4,961,685 | 10/1990 | Neubert ................................... 415/9 |
| 4,973,521 | 11/1990 | Graff et al. . |
| 5,229,177 | 7/1993 | Craven et al. ..................... 428/36.1 |
| 5,408,826 | 4/1995 | Stewart et al. ........................ 415/9 |
| 5,413,456 | 5/1995 | Kulak et al. ............................ 415/9 |
| 5,437,538 | 8/1995 | Mitchell ................................ 415/9 |

Primary Examiner—Edward K. Look
Assistant Examiner—Richard Woo
Attorney, Agent, or Firm—Jeffrey W. Astle

[57] ABSTRACT

An impact resistance fiber composite shell for supporting an elastic containment belt after impact with a radially propelled broken fan blade of a gas turbine engine.

8 Claims, 2 Drawing Sheets

IMPACT RESISTANT COMPOSITE SHELL FOR GAS TURBINE ENGINE FAN CASE

TECHNICAL FIELD

The invention relates to an impact resistant fibre composite shell for a turbofan engine fan case, the composite shell supporting an elastic containment belt after destructive impact with a radially propelled broken fan blade.

BACKGROUND OF THE ART

Gas turbine engines and particularly turbofan engines used in aircraft have a fan with a hub and plurality of fan blades disposed for rotation about a central axis. Catastrophic damage can occur to the aircraft and the occupants if a broken fan blade is propelled radially outwardly from the rotating hub under centrifugal force and impacts on the aircraft fuselage.

To prevent such damage, it is common to include a generally cylindrical fan case about the periphery of the fan for compliantly containing a broken fan blade. The fan case includes an elastic blade containment belt made of multiple plies of synthetic Kevlar (trademark) fabric for example. The compliant belt absorbs the impact from the broken blade and retains the broken blade within the fan case by destructive delamination and tearing of the Kevlar fabric under impact loading. Similar delaminating multiply fabrics are used in bulletproof body armour, fall arrest safety harnesses, etc.

Very high loads are imposed by the belt during impact on a belt support shell disposed inside the belt. The belt and belt support shell deflect under impact to an oval or elliptical shape. To avoid destructive contact between the interior of the deflected belt support shell and the remaining rotating fan blades, a degree of clearance is required and the belt support shell must be rigid enough to maintain sufficient clearance. The interior of the belt support shell may be lined with lightweight acoustic material and a wear plate to maintain the aerodynamic profile of the fan case and to reduce noise levels. On impact with the broken blade projectile, the acoustic material and wear plate shatter and disintegrate. Due to the displacement of acoustic material, the remaining clearance between the belt support shell (deflected to an oval shape under impact loading) and the rotating fan blades is sufficient to prevent destructive contact.

The design task for such belt support shells is substantial. The belt support shell must have a high strength to weight ratio with minimal profile, as must all aircraft structures to minimize aircraft lift requirements and drag losses. The belt support shell is disposed inside the compliant belt and therefore must allow the broken blade projectile to pass through the shell with as little resistance as possible to minimize the risk of contact between the remaining fan components and the broken blade or the deflected oval-shaped belt support shell. The extent of damage to the belt support shell on impact with the broken blade is highly unpredictable. Substantial safety factors must be provided to avoid catastrophic failure and inward collapse of the shell into the rotating fan. The remaining undamaged portions of the belt support shell must provide sufficient support to resist the loads imposed by the compliant belt as it stretches and delaminates on impact.

In general, conventional belt support shells are fabricated of aluminum for reduced weight, however, in some circumstances steel shells are also used. The broken fan blade passes through the thin walls of the belt support shell due to the high kinetic energy imparted by the high rotational velocity of the fan assembly. The blade projectile does not pass directly through the belt support shell in a purely radial direction, but rather cuts an arc of approximately 90° through the belt support shell as the blade is expelled radially under centrifugal force while continuing to rotate rapidly about the engine axis.

As the blade projectile impacts the compliant belt, significant tensile forces are generated in the belt as kinetic energy from the blade is absorbed. These forces are resisted by the belt support shell in its post impact or damaged state.

Conventional belt support shells are thin walled bodies of rotation which depend in large part for their strength on the structural shell behavior. A closed hoop or shell has significantly greater structural strength than an open section. Shell structures often have poor structural resistance after impact due to the damage caused by the blade passing through them. In the damaged state, high post impact loads applied by the compliant belt have in some cases caused complete inward collapse of the belt support shell. Such collapse is catastrophic leading to engine failure and possibly explosion. Needless to say such performance is completely unacceptable and may represent a greater risk to aircraft safety than the broken fan blade projectile itself. As a result the belt support shells must be designed to resist the tensile loads from the compliant belt in their damaged state. This has led to relatively robust and heavy designs for belt support shells which detrimentally effects the performance of the engine and aircraft as a whole. The structural strength of a shell is dependent on a closed body which can transfer and distribute forces throughout the thin wall of the shell. However, when impact occurs with a projectile, damage to the shell compromises the shell strength significantly.

The modern development of fibre composite structures has not been introduced to a great extent into aircraft structures. Traditional use of aluminum and metal alloys remains prevalent despite the cost and weight savings possible through use of fibre composites. Introduction of new materials involves significant testing and regulatory approval. To date most applications of composite materials in aircraft has been to less critical elements exposed to low stresses, such as door panels.

Composite materials utilize high strength fibres disposed in a relatively brittle matrix. Although the strength to weight ratio is superior to many metal alloys, the ductility of metal alloys provides preferred levels of safety over relatively brittle composites when exposed to high impact loadings. Composite structures are easily fabricated into complex shapes. However, the acceptance of fibre composite structures has been very slow especially where passenger safety is a paramount concern, such as in aircraft and automobile design.

Examples of fibre composite structures and fabrication methods are provided in the following U.S. patents: U.S. Pat. No. 4,086,378 to Kam et al shows a cylindrical composite structure with helical, axial and circumferential reinforcing ribs forming an interior lattice; U.S. Pat. No. 4,012,549 to Slysh describes a high strength composite structure with an isogrid lattice of equilateral triangles; U.S. Pat. No. 4,137,354 to Mayes, Jr. et al describes a ribbed composite cylindrical structure and manufacturing process; and U.S. Pat. No. 4,973,521 describes a composite bonded structure applied to an aircraft fan blade.

It is an object of the invention to provide a fiber composite shell to reduce the weight and expense involved in the conventional use of aluminum blade support shells.

It is a further object of the invention to provide a fiber composite belt support shell which retains much of its structural strength after impact with a broken blade projectile.

In particular, it is an object of the invention to provide a belt support shell which presents no impediment to outward movement of a broken blade but, resists the high impact stresses imposed by the compliant containment belt.

DISCLOSURE OF THE INVENTION

The invention provides an impact resistant fibre composite shell for supporting an elastic containment belt after impact with a radially propelled broken fan blade of a gas turbine engine. A conventional gas turbine turbofan engine includes a fan with a hub and fan blades disposed for rotation about a central axis. A life threatening and extremely damaging condition results if a defective fan blade breaks away from the hub and is propelled radially at high velocity under centrifugal force. It will be understood that the invention may be applied to any fan or bladed rotor. Usually gas turbine engine compressor blades and turbine rotor blades have less mass than fan blades and are encased within the engine such that broken rotor blades are prevented from exiting the engine. However due to the relatively large mass of an individual fan blade, and the external disposition of the fan outside the turbine engine, this application is used as the most likely practical embodiment of the invention for the purposes of the present description.

Conventionally a cylindrical fan case is provided about the periphery of the fan to compliantly contain a broken fan blade propelled radially outward from the rotating hub. Typically, the fan case includes an elastic compliant blade containment belt of several Kevlar fabric plies for example, and a belt support shell disposed inside the belt, usually fabricated from aluminium.

The invention provides an impact resistant fibre composite support shell of improved design. The fibre composite shell has two end support hoops each integrally manufactured with, or structurally bonded to, a centre breakaway lattice disposed radially adjacent the fan blades. The lattice permits the broken blade to cut a slit through the breakaway lattice passing to the elastic blade containment belt. The slit lattice has sufficient residual post-impact strength to distribute post-impact loads imposed by the elastic blade containment belt to the end support hoops of the shell. The breakaway lattice provides minimal resistance to blade projectile passage, while retaining sufficient post impact structural resistance to distribute loads to the intact end hoops of the belt support shell.

Conventional aluminium belt support shells are relatively heavy and rely upon closed shell strength to support the compliant belt. When a broken blade impacts such a shell, the damage may be severe enough to reduce the strength of the aluminium shell. Inward collapse of the aluminium belt support shell under the loads imposed by the compliant belt leads to catastrophic engine failure and possible uncontrolled explosion.

The composite shell of the invention permits the broken blade to pass through the breakaway lattice area and impact into the compliant belt. Although a portion of the lattice is destroyed and the damaged lattice portion cannot support post-impact loads imposed by the belt, the undamaged remaining portions of the lattice have sufficient strength to distribute post-impact loads to the undamaged end hoops of the shell. The undamaged lattice portion and undamaged end hoops support the compliant belt and prevent inward collapse of the belt into the fan.

In accordance with another aspect of the invention, there is provided a gas turbine engine comprising a fan with a hub and plurality of fan blades disposed for rotation about a central axis and a cylindrical fan case about the periphery of the fan for compliantly containing a broken fan blade propelled radially outward from the rotating hub under centrifugal force. The fan case comprises an elastic blade containment belt and a belt support shell disposed inside the belt, the shell comprising two end support hoops each integrally manufactured with and structurally bonded to a centre breakaway portion composed of an impact resistant fibre composite having an open lattice structure. The breakaway portion disposed radially adjacent the fan blades for permitting the broken blade to break through and impact upon the elastic blade containment belt and for distributing post-impact loads imposed by the elastic blade containment belt to the end support hoops.

In accordance with yet another aspect of the invention, there is provided a gas turbine engine comprising a fan with a hub and plurality of fan blades disposed for rotation about a central axis and a cylindrical fan case about the periphery of the fan for compliantly containing a broken fan blade propelled radially outward from the rotating hub under centrifugal force. The fan case comprises an elastic blade containment belt and a belt support shell disposed inside the belt, the shell comprising two end support hoops composed of an impact resistant fibre composite each integrally manufactured with and structurally bonded to a centre breakaway portion having an open lattice structure, the breakaway portion disposed radially adjacent the fan blades for permitting the broken blade to break through and impact upon the elastic blade containment belt and for distributing post-impact loads imposed by the elastic blade containment belt to the end support hoops.

Further details of the invention and its advantages will be apparent from the detailed description and drawing included below.

BRIEF DESCRIPTION OF THE DRAWINGS

In order that the invention may be readily understood, one preferred embodiment of the invention will be described by way of example, with reference to the accompanying drawing wherein.

DETAILED DESCRIPTION OF PREFERRED EMBODIMENTS

Figure 1:
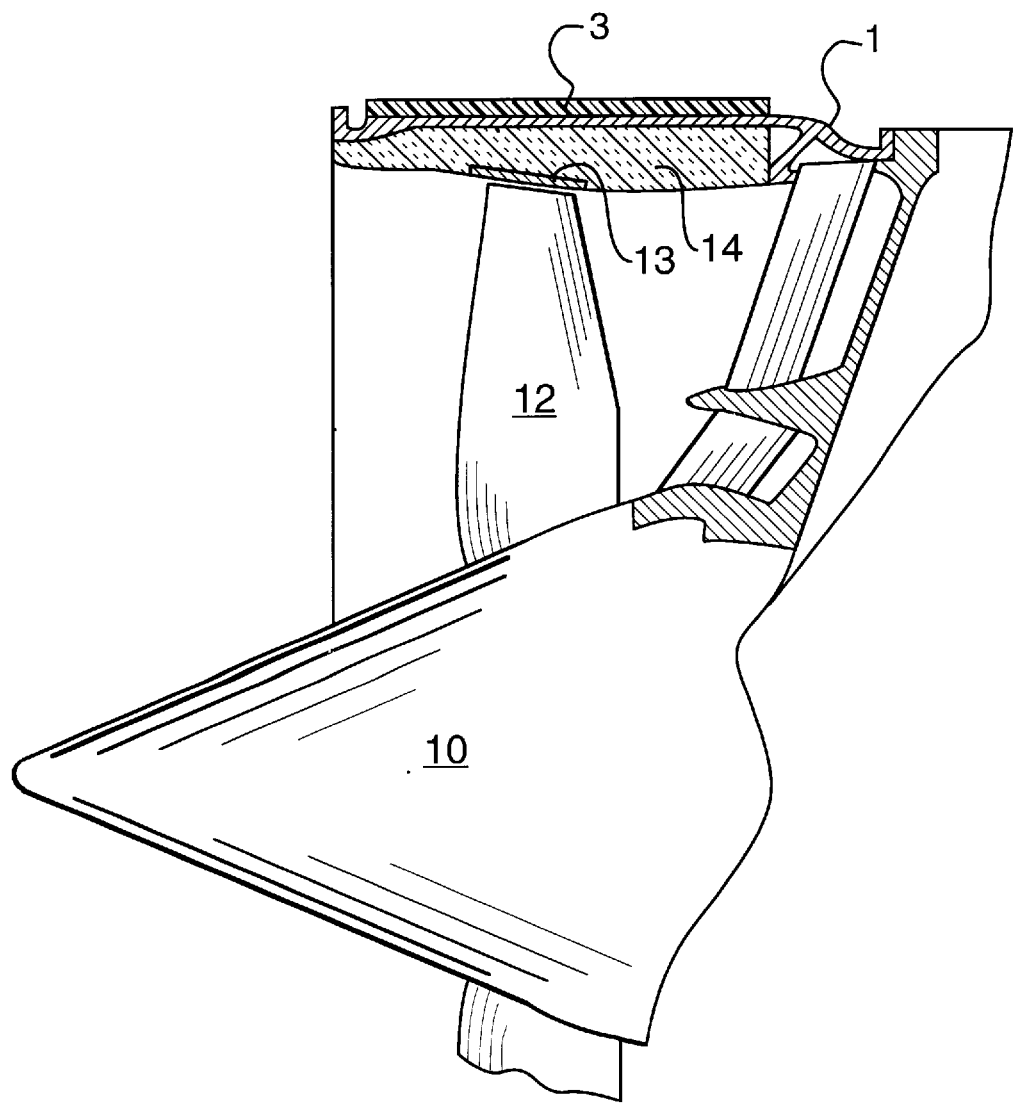
FIG. 1 is an axial cross-section through the forward end of a turbofan engine showing the fan, compliant belt and belt support shell.

FIG. 1 illustrates the disposition of the fiber composite belt support shell 1 which is generally in the shape of a cylinder disposed radially about the periphery of a fan assembly 10 having a rotating hub 11 and an array of radial fan blades 12.

On the interior surface of the belt support shell 1, a nonmetallic wear plate 13 and acoustic material 14 are installed. On the outer periphery of the belt support shell 1, is an elastic blade containment belt 3 made of several plies of Kevlar fabric for example. In general, the structure of such containment belts 3 is well known and it is not considered necessary to explain details of this structure herein.

Figure 2:
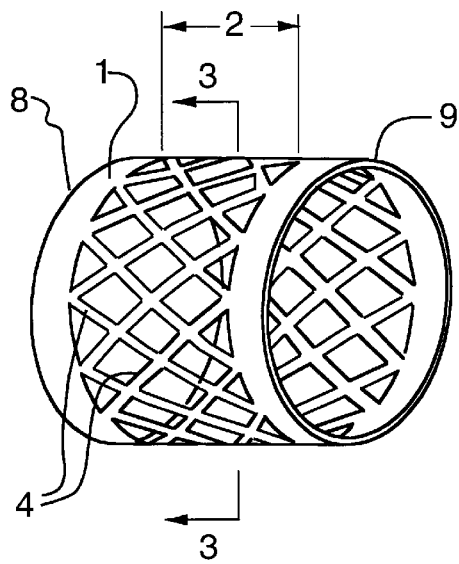
FIG. 2 is a perspective view of the fiber composite support shell illustrating the two end hoops and central breakaway lattice structure.
Figure 3:
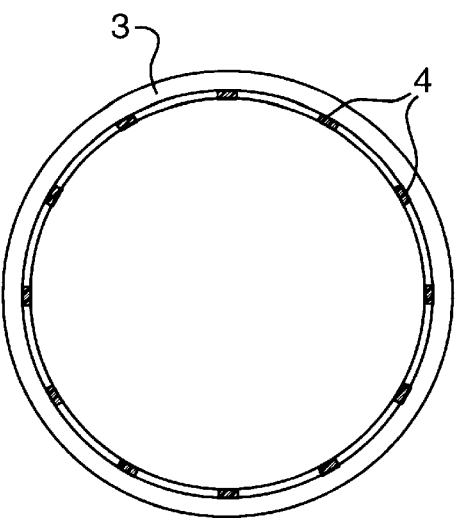
FIG. 3 is a radial section view along line 3—3 of FIG. 2 showing a pre-impact condition with the compliant belt outward of the lattice.

Referring to FIG. 2, the details of the belt support shell 1 are shown. For clarity, the flanges and design specific details of the shell 1 are eliminated. It will be understood that depending on the specific engine design, the belt support shell 1 will take on various cylindrical shapes. The specific attachment means to the engine are not an essential feature of the invention and will vary considerably depending on the engine configuration. Therefore, FIG. 2 shows a schematic generalized view of the essential portions of the belt support shell 1 for clarity.

As indicated in FIG. 2, the impact resistant fiber composite shell 1 has two end support hoops 8 and 9 each integrally manufactured with, or structurally bonded to centre breakaway lattice 2. The lattice area 2 is disposed radially adjacent the fan blades 12 and permits a broken blade 12 to cut a slit through the breakaway lattice 2 passing into the elastic blade containment belt 3.

Figure 4:
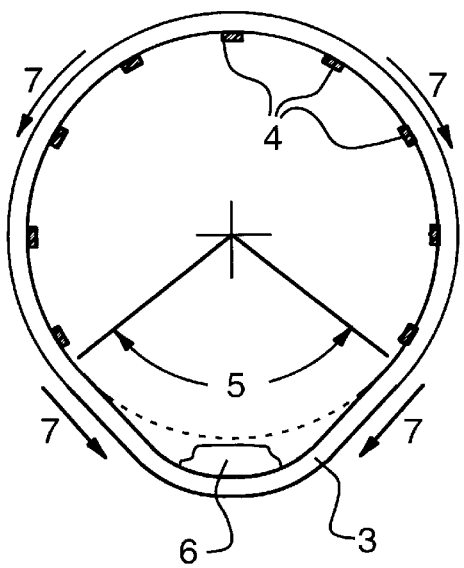
FIG. 4 is a like radial section view showing the post-impact view with the broken blade lodged between the compliant belt and the damaged lattice.

As indicated in FIG. 4, the blade 6 passes radially through the lattice 2 cutting an arcuate slit 5 through the lattice 2 of approximately 90° arc. The blade containment belt 3 absorbs the kinetic energy of the impact with the blade 6 by delaminating and distorting as indicated in FIG. 4 under the extremely high tensile forces indicated by arrows 7. The forces in the belt 3 are resisted by the exterior of the belt support shell 1.

The combination of end hoops 8 and 9 with the central lattice 12 of the belt support shell 1 is designed to withstand the entire load applied by the elastic containment belt 3 post impact and without the structural support of the damaged area adjacent slit 5.

Figure 5:
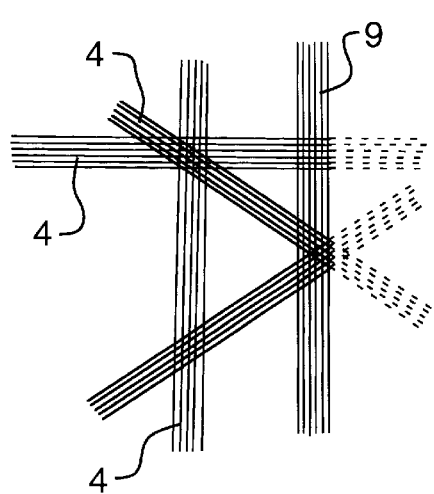
FIG. 5 is a detail view of the lattice and hoop fibers showing the various helical, circumferential and axial dispositions of fibers.

FIGS. 2 and 5 illustrate an open lattice structure which has a uniform repeating pattern of composite fiber ribs 4 spanning between the end support hoops 8 and 9. During impact damage from the blade 6, an arc 5 will be cut through these ribs 4. However, the remaining uncut ribs 4 serve to distribute the post impact loads imposed by the elastic blade containment belt 3 to the end support hoops 8 and 9 of the shell 1. As a result, the blade 6 is contained and the post impact strength of the composite shell 1 is sufficient to resist the circumferential loads exerted by the elastic containment belt 3. In contrast, a solid composite shell would resist passage of the blade projectile 6 deflecting the blade 6 and could shatter or sustain significant structural damage.

A significant benefit of the invention is the reduced weight possible through use of efficient fiber composite materials to replace a metallic shell that is generally very heavy and difficult to manufacture, install and maintain.

With reference to FIG. 2, a preferred arrangement of ribs 4 that are helically disposed is illustrated. With reference to FIG. 5, it can be seen that the fibres embedded in matrix forming the helical ribs 4 overlap the fibres of the circumferential hoops 8 and 9. The ribs 4 and hoops 8, 9 may be manufactured concurrently by a process known as multihead filament winding. This provides ribs 4 and hoops 8, 9 that are interwoven for more efficient transmission of impact loads. Alternatively, fibers in the hoops 8 and 9 and ribs 4 may be laid up in conventional fashion with ends trimmed after curing as indicated by dashed lines in FIG. 5. The design of the lattice is dependent upon individual loading conditions which will vary for different engine configurations, blade sizes, fan velocities etc.

It is contemplated however, that any type of lattice design can be adapted for use with the invention. As shown in FIG. 5, the ribs 4 can be helically disposed, circumferentially disposed, or axially disposed depending upon the application and strength required. It is also possible to uniformly distribute fibers across the outward surface of the lattice area, however, it is considered more advantageous to cluster the fibers together into discreet ribs 4 which enable the blade 6 to easily pass through the open lattice while retaining structural strength of the undamaged lattice to resist the post impact loading of the belt 3.

Fibers in the hoops 8 and 9 themselves are preferably circumferentially disposed to resist hoop stresses imposed by the overlying belt 3 through the lattice 2. Various lattice designs may be contemplated for example, Warren truss, bridge truss, bridge truss, geodetic and other known lattice design patterns. It will be understood that the invention is not restricted to any particular lattice design or the particular helical design as illustrated in the accompanying drawings.

Also contemplated by the invention are elastic containment belt supporting shell structures comprising combinations of either hoops or lattice structures composed of composite materials.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A composite shell for a fan case for a gas turbine engine, the gas turbine engine comprising a fan with a hub and plurality of fan blades disposed for rotation about a central axis and the fan case being cylindrical and adapted to be installed about the periphery of the fan for compliantly containing a broken fan blade propelled radially outward from the rotating hub under centrifugal force, the fan case comprising an elastic blade containment belt, the composite shell disposed radially inward from the belt whereby the shell is composed of an impact resistant fibre composite comprising two end support hoops each integrally manufactured with and structurally bonded to a center breakaway portion having an open lattice structure, the breakaway portion adapted to be, in use, disposed radially adjacent the fan blades to permit the broken blade to break through and impact upon the elastic blade containment belt and to distribute post-impact loads imposed by the elastic blade containment belt to the end support hoops.

2. A composite shell according to claim 1 wherein the lattice includes a uniform repeating pattern of composite fibre ribs.

3. A composite shell according to claim 2 wherein at least some of the ribs are helically disposed.

4. A composite shell according to claim 2 wherein at least some of the ribs are circumferentially disposed.

5. A composite shell according to claim 2 wherein at least some of the ribs are axially disposed.

6. A composite shell according to claim 1 wherein the fibres in the hoops are circumferentially disposed.

7. In a gas turbine engine comprising a fan with a hub and plurality of fan blades disposed for rotation about a central axis and a cylindrical fan case about the periphery of the fan for compliantly containing a broken fan blade propelled radially outward from the rotating hub under centrifugal force, the fan case comprising an elastic blade containment belt and a belt support shell disposed radially inward from the belt whereby the shell comprises two end support hoops each integrally manufactured with and structurally bonded to a centre breakaway portion composed of a fibre composite having an open lattice structure, the breakaway portion disposed radially adjacent the fan blades and adapted to permit the broken blade to break through and impact upon the elastic blade containment belt and to distribute post-impact loads imposed by the elastic blade containment belt to the end support hoops.

8. In a gas turbine engine comprising a fan with a hub and plurality of fan blades disposed for rotation about a central axis and a cylindrical fan case about the periphery of the fan for compliantly containing a broken fan blade propelled radially outward from the rotating hub under centrifugal force, the fan case comprising an elastic blade containment belt and a belt support shell disposed radially inward from the belt whereby the shell comprises two end support hoops composed of a fibre composite each integrally manufactured with and structurally bonded to a centre breakaway portion having an open lattice structure, the breakaway portion disposed radially adjacent the fan blades and adapted to permit the broken blade to break through and impact upon the elastic blade containment belt and to distribute post-impact loads imposed by the elastic blade containment belt to the end support hoops.

* * * * *